Dec. 26, 1950         R. E. SMITH         2,535,608

ELECTRONIC IMPEDANCE METER

Filed Aug. 26, 1947

INVENTOR.
REX E. SMITH
BY
McMorrow, Berman & Davidson
ATTORNEYS

Patented Dec. 26, 1950

2,535,608

UNITED STATES PATENT OFFICE 2,535,608

ELECTRONIC IMPEDANCE METER

Rex E. Smith, Bakersfield, Calif.

Application August 26, 1947, Serial No. 770,577

1 Claim. (Cl. 175—183)

This invention relates to impedance measuring devices, and more particularly to an electronic instrument for measuring impedances of the inductive or resistive types.

A main object of the invention is to provide a novel and improved impedance meter which is very simple in construction, easy to use and providing rapid measurements of unknown resistances, reactances or impedances.

A further object of the invention is to provide an improved electronic impedance measuring instrument which is inexpensive to manufacture, simple to operate and accurate in performance.

Further objects and advantages of the invention will become apparent from the following description, and claim, and from the accompanying drawings, wherein:

Figure 2:
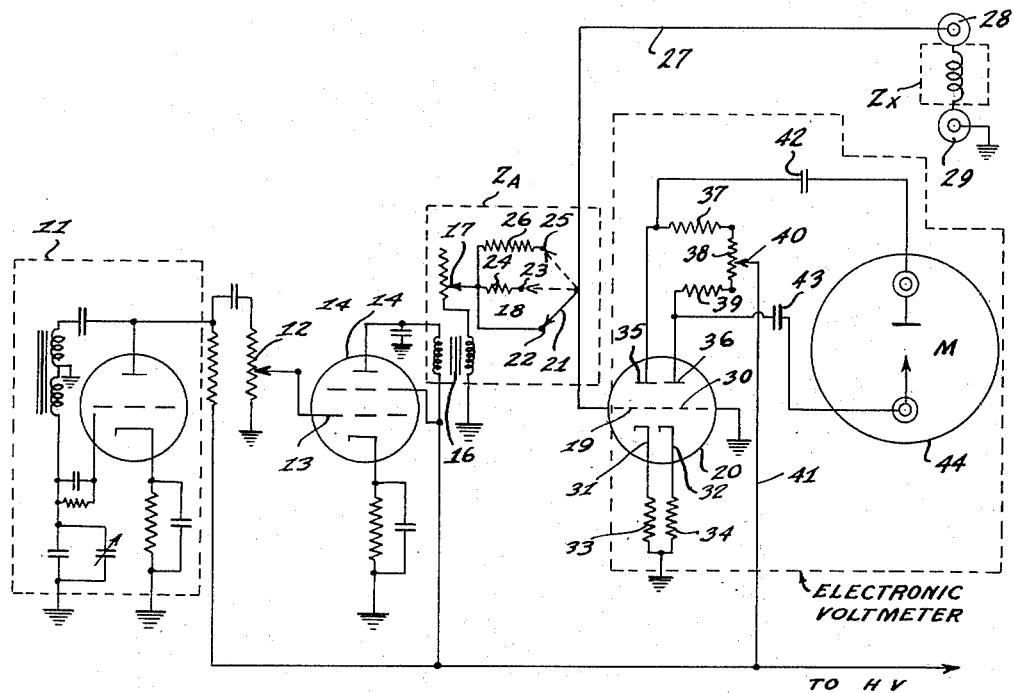
Figure 2 is a wiring diagram of an impedance meter constructed in accordance with the present invention.

Referring to the drawings, 11 designates a suitable alternating current generator, such as a shunt fed Hartley audio frequency oscillator illustrated in Figure 2. The output of the oscillator is fed through a voltage control potentiometer 12 to the grid 13 of a power amplifier tube 14 and the amplified output voltage is impressed across the primary of an output transformer 16. The secondary of transformer 16 is connected through a rheostat 17 and a multiplier device 18 to a first grid 19 of a dual triode 20. The multiplier device 18 comprises a selector switch arm 21 which may be actuated so as to connect grid 19 either to a first contact 22 connected directly to rheostat 17, to a second contact 23 connected to rheostat 17 through a first multiplier resistor 24 or to a third contact 25 connected to rheostat 17 through a second multiplier resistor 26. Switch arm 21 is also connected by a wire 27 to a first test jack 28. A second test jack 29 is provided which is grounded. The unknown impedance, indicated as $Z_x$ is shown connected across the jacks 28 and 29.

The second grid, shown at 30, of dual triode 20 is grounded. The cathodes 31 and 32 of said duel triode are connected to ground through respective grid biasing resistors 33 and 34. The respective plates 35 and 36 of the dual triode are connected together through a fixed resistance 37, a potentiometer winding 38 and a fixed resistance 39. The contact arm 40 of the potentiometer is connected by a wire 41 to the positive high voltage terminal of a suitable direct current source. The negative terminal of said source is grounded. Connected to plates 35 and 36 through respective direct current blocking condensers 42 and 43 is a rectifier type meter 44 adapted to indicate the difference of alternating current potential across the plates 35 and 36.

Figure 1:
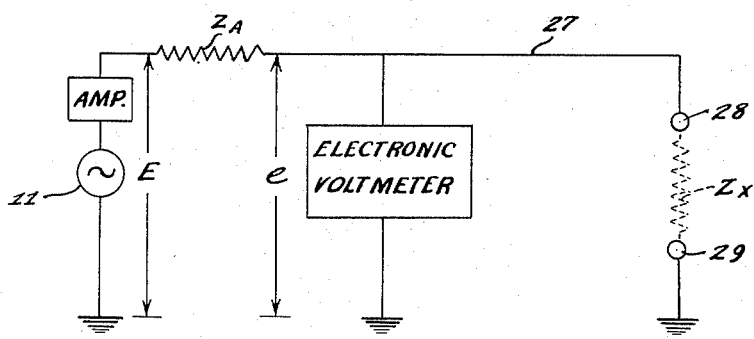
Figure 1 is a simplified block diagram illustrating the principles employed in the present invention.

Referring now to Figure 1, let us assume that the A. C. voltage at the output terminals of the amplifier stage has a value E. The impedance network including the transformer 16, rheostat 17 and multiplier device 18 is designated as $Z_a$. The A. C. potential at grid 19 will then have a value $e$. If the jacks 28 and 29 are open circuited there will be no current flow from generator 11 and voltage $e$ will be equal to voltage E since there is no voltage drop through impedance $Z_a$. If terminals 28 and 29 are short circuited the voltage $e$ will be zero. Under these short circuit conditions, contact arm 40 is adjusted on the rheostat winding 38 so that the plates 35 and 36 are placed at equal potential, and consequently the meter 44 gives a zero reading. If the unknown impedance $Z_x$ is then substituted for the short circuit at test jacks 28 and 29, the meter 44 will give a reading corresponding to the value of said unknown impedance.

The voltage drop $V_a$ across the impedance $Z_a$ is given by $$V_a = I_0 Z_a = E \quad (1)$$

where $I_0$ is the current flowing in the impedance $Z_a$ when jacks 28 and 29 are short-circuited. The signal voltage impressed on grid 19 is zero under these conditions.

When an unknown inductive impedance $Z_x$ is substituted at jacks 28 and 29, the voltage drop $V_{ax}$ across the impedance $Z_a$ is given by $$V_{ax} = I_x Z_a \quad (2)$$

where $I_x$ is the current flowing in the series circuit containing $Z_a$ and $Z_x$. Assuming that no capacity is present in the circuit, $I_x$ will be less than $I_0$. Therefore $V_{ax}$ will be less than $V_a$ and the A. C. signal voltage on grid 19 will have a positive effective value, given by $$e = E - V_{ax} \quad (3)$$

Since the voltage on grid 19 is increased, more electron current flows to plate 35, causing the A. C. potential of plate 35 to become different than that of plate 36. The meter 44 gives a reading corresponding to this difference in potential.

As an example of the operation of the instrument, assume that with contact arm 21 engaging contact 22 the impedance $Z_a$ is 10 ohms. Assume that meter 44 gives full scale deflection when jacks 28 and 29 are open-circuited, and contact 40 has been adjusted to give zero reading when said jacks are short circuited. Now, if a 10 ohm resistor or inductance is connected across jacks 28 and 29, the signal voltage at grid 19 is reduced to approximately one half the value it had when jacks 28 and 29 were open-circuited, due to the voltage drop in $Z_a$. The meter 44 will then give a reading corresponding to the 10 ohm impedance connected across jacks 28 and 29. The meter is suitably calibrated with three separate impedance scales, corresponding to the connection of contact arm 21 with contact 22, contact 23 and contact 25, respectively. The contacts 23 and 25 are employed when higher unknown impedances are to be measured. The zero setting procedure is the same in each case.

While a specific embodiment of an impedance measuring device has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

An instrument for measuring inductive impedances comprising an audio frequency oscillator, an inductive impedance separate from said audio frequency oscillator, circuit means connecting said inductive impedance in series with said oscillator, said means including a rheostat, a plurality of resistors, each connected at one terminal to one terminal of said rheostat, and switch means selectively contacting the remaining terminals of said resistors for connecting a desired resistor in circuit with said impedance, a dual triode, means connecting said switch means to a first grid of said dual triode, means connecting the second grid of said dual triode to said oscillator, whereby said grids are in series relation with the oscillator and said inductive impedance, a potentiometer winding connecting the plates of the triode, a contact arm adjustably engaging said winding and connected to a source of direct current plate voltage, an alternating current meter connected across said plates, and a pair of test jacks connected to the respective grids of said dual triode, whereby the meter may be set to a zero reading by short-circuiting said test jacks and adjusting said contact arm.

REX E. SMITH.

REFERENCES CITED

The following references are of record in the file of this patent:

UNITED STATES PATENTS

| Number | Name | Date |
|---|---|---|
| 2,033,465 | Graham | Mar. 10, 1936 |
| 2,140,662 | Zuschlag | Dec. 20, 1938 |

OTHER REFERENCES

Radio News, January 1944, pages 28–31.